(12) United States Patent
Sasai et al.

(10) Patent No.: US 12,544,814 B2
(45) Date of Patent: Feb. 10, 2026

(54) WASTE PHOTOVOLTAIC MODULE PROCESSING METHOD

(71) Applicant: Tokuyama Corporation, Shunan (JP)

(72) Inventors: Masaru Sasai, Hokkaido (JP); Takeharu Yamashita, Hokkaido (JP)

(73) Assignee: Tokuyama Corporation, Shunan (JP)

( * ) Notice: Subject to any disclaimer, the term of this patent is extended or adjusted under 35 U.S.C. 154(b) by 641 days.

(21) Appl. No.: 18/013,077

(22) PCT Filed: Jun. 30, 2021

(86) PCT No.: PCT/JP2021/024728
§ 371 (c)(1),
(2) Date: Dec. 27, 2022

(87) PCT Pub. No.: WO2022/004781
PCT Pub. Date: Jan. 6, 2022

(65) Prior Publication Data
US 2023/0241655 A1    Aug. 3, 2023

(30) Foreign Application Priority Data
Jul. 1, 2020  (JP) .................... 2020-114353

(51) Int. Cl.
*B09B 3/40*  (2022.01)
(52) U.S. Cl.
CPC ..................... *B09B 3/40* (2022.01)
(58) Field of Classification Search
None
See application file for complete search history.

(56) References Cited

U.S. PATENT DOCUMENTS

2021/0305450 A1    9/2021 Sasai et al.

FOREIGN PATENT DOCUMENTS

| CN | 109365482 A | 2/2019 | |
|---|---|---|---|
| EP | 0893250 A1 * | 1/1999 | ......... B32B 17/1099 |

(Continued)

OTHER PUBLICATIONS

Ueno et al., "Thermal Degradation of Polymer Main Chains", Kobunshi Ronbunshu, Sep. 2007, pp. 575-582, vol. 64, No. 9.

*Primary Examiner* — Jason Lau
(74) *Attorney, Agent, or Firm* — The Webb Law Firm

(57) ABSTRACT

This waste photovoltaic module processing method is a method of continuously treating a waste photovoltaic module. The method includes a heating step of heating a photovoltaic module having a resin back sheet, etc. in a thermal decomposition furnace to melt and oxidatively decompose resin components included in the photovoltaic module, in which the heating step is performed by moving the photovoltaic module in the thermal decomposition furnace from an inlet of the thermal decomposition furnace toward an outlet in a state where the photovoltaic module is placed on a porous ceramic support (A), and the ceramic support (A) is placed on a porous material (B) carrying a transition metal oxide, and an inside of the thermal decomposition furnace includes a temperature rising section in a stage where a temperature of the photovoltaic module rises, and a combustion section in a stage where the resin components are oxidatively decomposed, and an oxygen concentration in the combustion section is controlled to a range from 6 vol % to less than 15 vol %.

4 Claims, 3 Drawing Sheets

(56) References Cited

FOREIGN PATENT DOCUMENTS

| | | |
|---|---|---|
| JP | H1147000 A | 2/1999 |
| JP | 111165150 A | 6/1999 |
| JP | 2007059793 A | 3/2007 |
| JP | 2011080664 A | 4/2011 |
| JP | 2014024037 A | 2/2014 |
| JP | 2014108375 A | 6/2014 |
| JP | 2016190177 A | 11/2016 |
| JP | 2020142218 A | 9/2020 |
| KR | 1020120096172 A | 8/2012 |
| WO | 2020031661 A1 | 2/2020 |

\* cited by examiner

[Fig. 1]
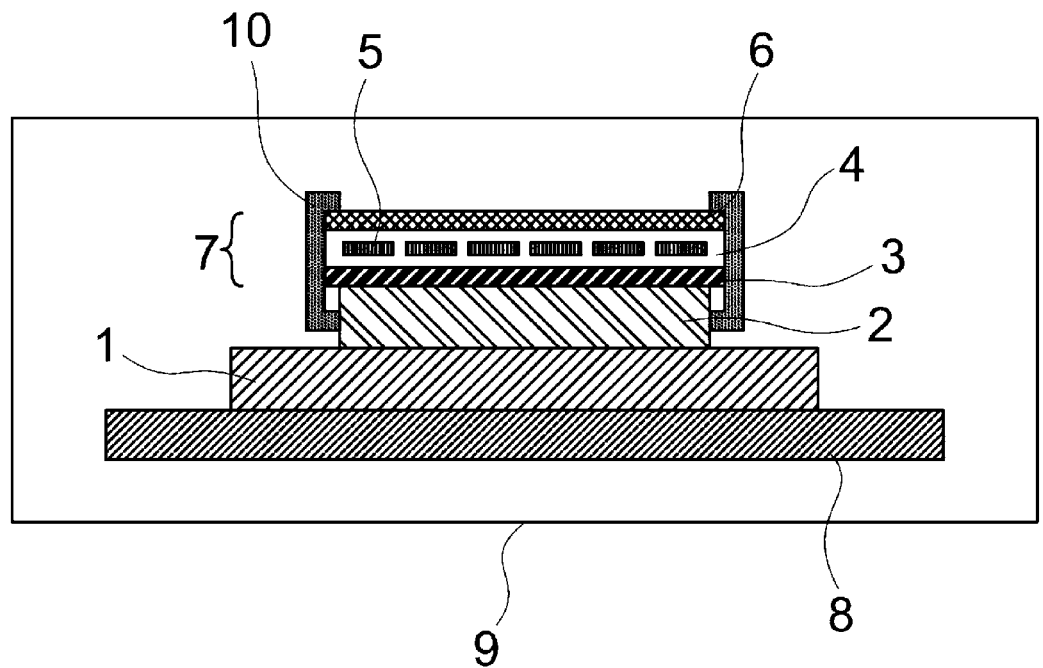
[Fig. 2]
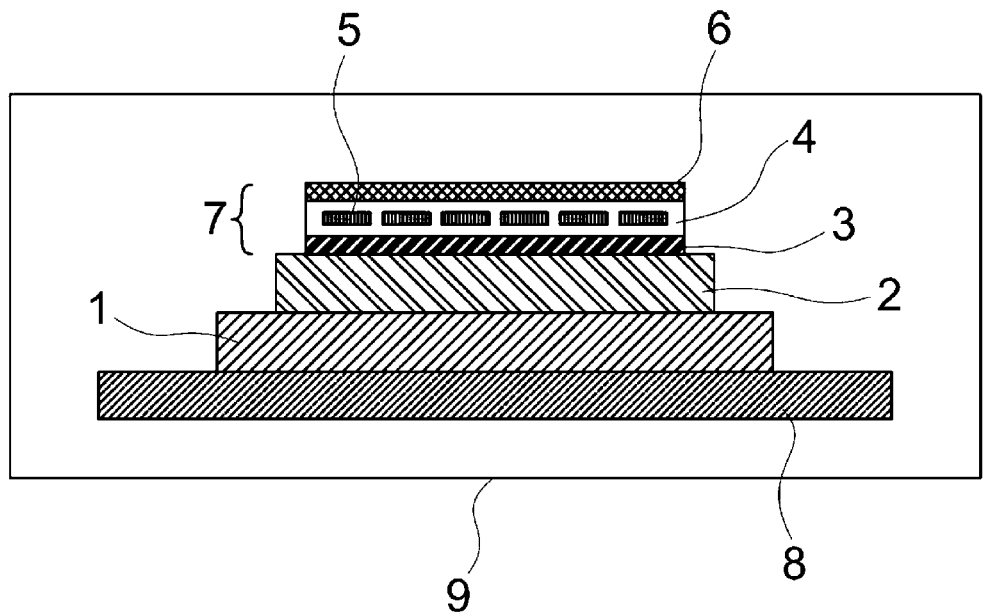

[Fig. 3]
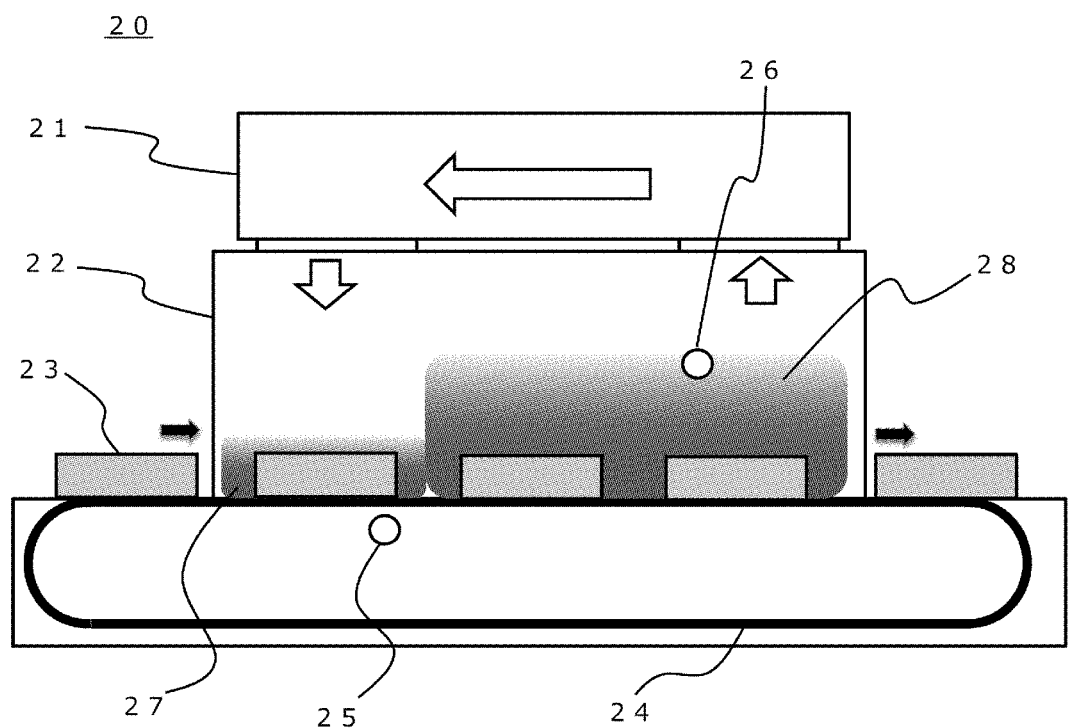

[Fig. 4]
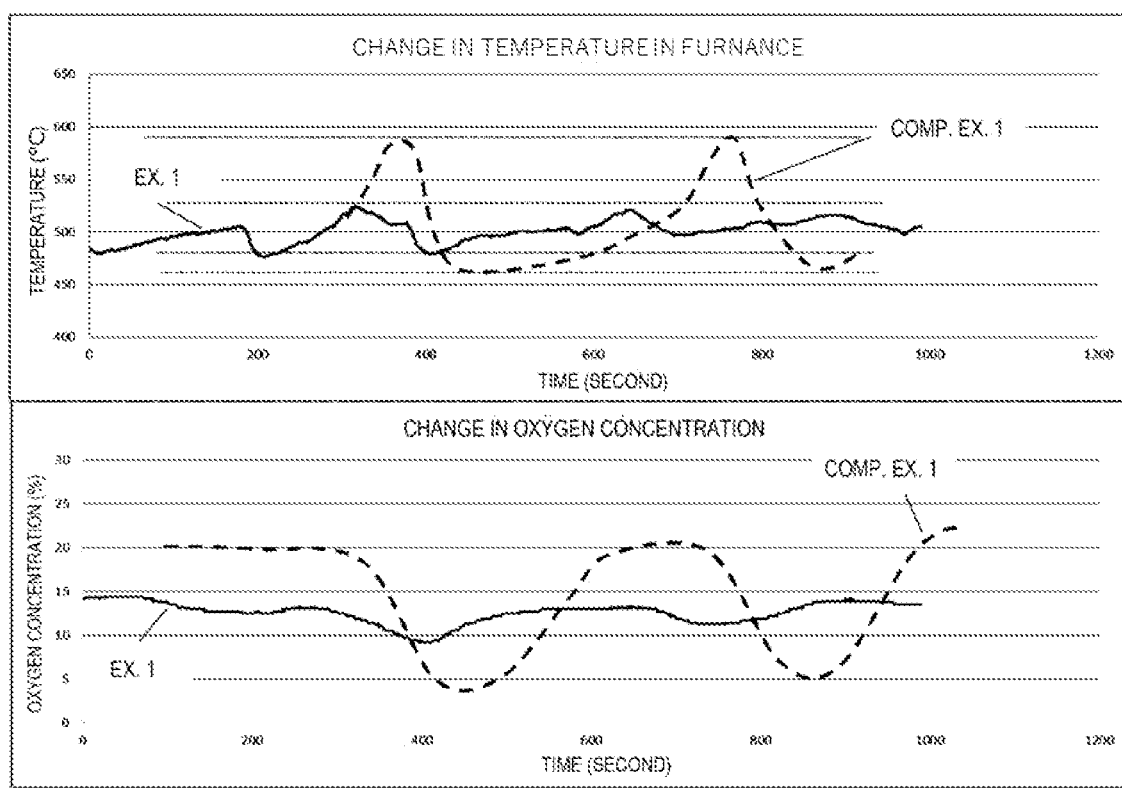

WASTE PHOTOVOLTAIC MODULE PROCESSING METHOD

CROSS-REFERENCE TO RELATED APPLICATIONS

This application is the United States national phase of International Application No. PCT/JP2021/024728 filed Jun. 30, 2021, and claims priority to Japanese Patent Application No. 2020-114353 filed Jul. 1, 2020, the disclosures of which are hereby incorporated by reference in their entirety.

BACKGROUND OF THE INVENTION

Field of the Invention

The present invention relates to a waste photovoltaic module processing method. More specifically, the present invention relates to a method of removing resin components, such as a back sheet and a sealing resin layer, from a photovoltaic module, and separating the module into, for example, glass, a cell, silver, and an aluminum frame to recover valuable materials.

Description of Related Art

Toward the realization of a low-carbon society, the acceleration of $CO_2$ reduction by utilizing renewable energy such as photovoltaic power generation is about to progress. While the introduction of photovoltaic power generation has progressed significantly, the issue of recycling when disposing of photovoltaic modules has been pointed out.

The structure of a general photovoltaic module is made of three layers: tempered glass on the front surface, a sealing resin layer on the inside, and a back sheet on the back surface. An electric wire (interconnector) connecting the photovoltaic module is wired in the sealing resin layer. The sealing resin is required to have transparency, flexibility, adhesiveness, tensile strength, weather resistance, etc., and an ethylene-vinyl acetate copolymer (hereinafter abbreviated as "EVA") is generally used. It serves to bond the tempered glass, cell, and back sheet by heating and pressurizing. When this photovoltaic module is heated in an electric furnace or the like in an oxidizing atmosphere, EVA is melted at 80 to 120° C., a deacetylation reaction of EVA occurs at around 350° C., and a thermal decomposition reaction of the polyethylene part, which is the main chain, occurs rapidly at around 450° C. A technique of thermally decomposing a photovoltaic module to recycle it as described above is disclosed (see Patent Literature 1: JP H11-165150 A and Patent Literature 2: JP 2007-59793 A).

However, since a thermal decomposition reaction at around 450° C. occurs explosively, thermal decomposition of a photovoltaic module with a size of about 1 m×2 m may cause a fire, and is not suited for large-scale operation. In order to solve this technical problem, a method of recovering a photovoltaic element constituent material has been disclosed, the method including a step of transferring a photovoltaic element to a continuous heat treatment furnace in which oxygen concentration in the furnace is maintained at 1.0% by volume or more and 3.0% by volume or less; releasing and removing acetic acid gas, which is a kind of EVA decomposition gas, in a preheating decomposition section set to 300 to 400° C.; and then desorbing the EVA decomposition gas other than acetic acid in a heat treatment section set to 400 to 550° C., thereby removing an EVA sealing material from the photovoltaic element and separating a cell section and a glass substrate (see Patent Literature 3: JP 2014-108375 A).

Moreover, the present applicant has proposed a method of recovering valuable materials from a photovoltaic module having a resin back sheet and a sealing resin layer, the method including: a loading step of loading the photovoltaic module on a heat-resistant porous molded body with the back sheet surface facing down; and a heating step of heating a load including the photovoltaic module and the porous molded body in a heating furnace in an oxidizing atmosphere having an oxygen concentration of 15% or more to melt and then combust resin components (see Patent Literature 4: WO 2020/031661 A).

SUMMARY OF THE INVENTION

Technical Problem

In the method presented in Patent Literature 3, in order not to cause a rapid combustion reaction, oxygen concentration is controlled to be very low, and the resin components such as EVA are thermally decomposed under heating conditions in two stages. However, it cannot be said that this method is easy, because controlling the oxygen concentration and temperature in the furnace under the conditions of Patent Literature 3 is complicated, and requires considerable skill for operation.

Furthermore, in the early days when the applications of Patent Literatures 1 to 3 were filed, a material of a back sheet for photovoltaic module was weather-resistant polyvinyl fluoride (hereinafter abbreviated as "PVF") in most cases, but today cheaper polyethylene terephthalate (hereinafter abbreviated as "PET") has become the mainstream. Also, single-layer PET, and two- and three-layer back sheets in which PET is laminated with a fluoropolymer including, for example, PVF or polyvinylidene fluoride (hereafter abbreviated as "PVDF"), such as PVF/PET, PVDF/PET, PVF/PET/PVF, and PVDF/PET/PVDF, are widely used, and most back sheets use PET.

Fluoropolymer such as PVF and PVDF are thermally decomposed at about the same temperature as EVA, and therefore, conventional thermal decomposition methods do not pose a problem, whereas PET is melted at 250° C. and begins to be thermally decomposed at around 400° C., and has benzene rings and ester groups, and thus undergoes a wide range of thermal decomposition reactions. Carbides in which benzene rings are complicatedly bonded to each other may be formed as a byproduct, resulting in the formation of black "soot", and once "soot" is attached to glass, it is difficult to reuse the glass. It has also been reported that 9% of the residual amount of this "soot" remains even when combusted at 850° C. (see Non Patent Literature 1: Japanese Journal of Polymer Science and Technology, Vol. 64., No. 9 (2007)).

Accordingly, with the technique of Patent Literature 3 in which the oxygen concentration is lowered, even though EVA can be thermally decomposed, PET is not thermally decomposed completely. Therefore, when a photovoltaic module using a PET back sheet is heat-treated, it is fully covered with "soot", and at the same time, inorganic powders such as titanium oxide and calcium carbonate included in the back sheet also remain, so that more advanced separation technique has been needed to recycle valuable materials.

On the other hand, in the method of Patent Literature 4, by arranging a heat-resistant material carrying a transition metal oxide in the furnace, generation of "soot" when combusting an aromatic resin such as PET can be suppressed, and treatment that enables valuable materials that can be reused in the photovoltaic module to be easily recovered can be performed. However, if an attempt is made to perform continuous heat treatment on a photovoltaic module in an oxidizing atmosphere having an oxygen concentration of 15% or more, a rapid increase in temperature due to explosive combustion with a flame causes temperature control to be significantly shifted to an upper limit, and it is difficult to stably perform treatment. As a result, a new issue that has not been discovered in batch-type treatment, such as an increase in a treatment cost or incomplete treatment, has been found.

Based on the above, the purpose of the present invention is to provide a method of performing continuous treatment on a waste photovoltaic module by performing stable temperature control, in order to recycle valuable materials included in a photovoltaic module having a resin back sheet and the like.

Solution to Problem

The present inventors have conducted diligent studies to solve the above problems. As a result, the present inventors have found that resin components can be combusted gently and stably, and can be removed, by moving a photovoltaic module in a thermal decomposition furnace from an inlet of the thermal decomposition furnace toward an outlet in a state where the photovoltaic module is placed on a ceramic support that is porous, and the ceramic support is placed on a porous material carrying a transition metal oxide to perform continuous heat treatment, and by controlling an oxygen concentration in a combustion section in a stage of oxidatively decomposing the resin components to fall under a specified range, and this enables treatment under stable temperature control, and the present inventors have completed the present invention.

Stated another way, the present invention relates to a waste photovoltaic module processing method of continuously treating a waste photovoltaic module, the waste photovoltaic module processing method including a heating step of heating a photovoltaic module having a resin back sheet and a sealing resin layer in a thermal decomposition furnace to melt and oxidatively decompose resin components included in the photovoltaic module, in which the heating step is performed by moving the photovoltaic module in the thermal decomposition furnace from an inlet of the thermal decomposition furnace toward an outlet in a state where the photovoltaic module is placed on a porous ceramic support (A), and the ceramic support (A) is placed on a porous material (B) carrying a transition metal oxide, and an inside of the thermal decomposition furnace includes a temperature rising section in a stage where a temperature of the photovoltaic module rises, and a combustion section in a stage where the resin components are oxidatively decomposed, and an oxygen concentration in the combustion section is controlled to a range from 6 vol % to less than 15 vol %.

Advantageous Effects of Invention

In the present invention, the resin components such as EVA and PET, which have been melted before ignition, permeate into a heat-resistant porous molded body to expand their surface areas, and are gently combusted, thus avoiding a rapid combustion reaction and allowing them to be combusted stably. Furthermore, generation of "soot" when combusting an aromatic resin such as PET can be suppressed, and valuable materials that can be reused in the photovoltaic module can be easily recovered.

BRIEF DESCRIPTION OF THE DRAWINGS

FIG. 1 is a schematic view (with an aluminum frame) illustrating an embodiment of the present invention.

FIG. 2 is a schematic view (without the aluminum frame) illustrating the embodiment of the present invention.

FIG. 3 is a schematic view illustrating an outline of a thermal decomposition furnace that was used in an example and a comparative example.

FIG. 4 is a graph illustrating a change in temperature and oxygen concentration in a furnace in the example and the comparative example.

DESCRIPTION OF THE INVENTION

The present invention is described in detail below.

A waste photovoltaic module processing method according to the present invention is a method of continuously treating a waste photovoltaic module, the method including a heating step of heating a photovoltaic module having a resin back sheet and a sealing resin layer in a thermal decomposition furnace to melt and oxidatively decompose resin components included in the photovoltaic module, in which the heating step is performed by moving the photovoltaic module in the thermal decomposition furnace from an inlet of the thermal decomposition furnace toward an outlet in a state where the photovoltaic module is placed on a porous ceramic support (A), and the ceramic support (A) is placed on a porous material (B) carrying a transition metal oxide, and an inside of the thermal decomposition furnace includes a temperature rising section in a stage where a temperature of the photovoltaic module rises, and a combustion section in a stage where the resin components are oxidatively decomposed, and an oxygen concentration in the combustion section is controlled to a range from 6 vol % to less than 15 vol %.

<Heating Step>

The heating step in the processing method according to the present invention is a step of heating a photovoltaic module having a resin back sheet and a sealing resin layer in a thermal decomposition furnace to melt and oxidatively decompose resin components included in the photovoltaic module.

In the heating step, the photovoltaic module is moved in the thermal decomposition furnace from an inlet of the thermal decomposition furnace toward an outlet in a state where the photovoltaic module is placed on a porous ceramic support (A), and the ceramic support (A) is placed on a porous material (B) carrying a transition metal oxide (see FIG. 1). At this time, it is preferable that the photovoltaic module be placed on the ceramic support (A) with a back sheet surface facing down. Furthermore, in order to increase the processing efficiency on the waste photovoltaic module, it is preferable that a plurality of photovoltaic modules be continuously moved in such a way that a plurality of photovoltaic modules is in a heated state in the thermal decomposition furnace. Note that in performing heat processing on an object to be treated including the photovoltaic module, the ceramic support (A), and the porous material (B), the object to be treated may be put into, for example, an iron lattice tray in order to prevent the photovoltaic module, the ceramic support (A), and the porous material (B) from being misaligned or being turned over in a movement in the furnace.

In the heating step, the inside of the thermal decomposition furnace includes a temperature rising section in a stage where a temperature of the photovoltaic module rises, and a combustion section in a stage where the resin components are oxidatively decomposed (combusted). Normally, a side of the inlet of the thermal decomposition furnace serves as the temperature rising section, and a side of the outlet serves as the combustion section. However, if temperature rises, and the resin components are melted and oxidatively decomposed according to a movement of the photovoltaic module from the side of the inlet to the side of the outlet in the furnace, a boundary between the temperature rising section and the combustion section does not need to be clear in the thermal decomposition furnace.

The combustion in the present invention is an oxidation reaction in which organic substances such as EVA and PET included in, for example, the back sheet and the sealing resin layer constituting the photovoltaic module react with oxygen in the atmosphere.

Accordingly, the combustion temperature is appropriately determined depending on the resin constituting the back sheet, but is preferably 425 to 575° C. When the temperature is 425° C. or higher, it is higher than the thermal decomposition temperatures of EVA and PET, and combustion occurs. Furthermore, when the temperature is 575° C. or lower, rapid combustion can be suppressed, and the glass of the photovoltaic module can be prevented from being damaged.

Note that the melting starts to occur at a temperature lower than the combustion temperature. In order to obtain the combustion temperature, it is common to raise the temperature of the photovoltaic module from room temperature before entering the thermal decomposition furnace, and the melting temperature can be obtained during this temperature raising process.

The heating in the heating step should be performed in the thermal decomposition furnace in consideration of the processing of exhaust gas and the like. The thermal decomposition furnace is not particularly limited as long as it is a thermal decomposition furnace, such as a gas furnace or an electric furnace, that enables the combustion temperature to be obtained, and into which the object to be treated including the porous material (B), the ceramic support (A), and the photovoltaic module (X) can be charged, and a known thermal decomposition furnace can be used.

A method of heating the inside of the thermal decomposition furnace is not particularly limited as long as the combustion temperature can be obtained. However, for example, in the case of a gas furnace, a method of heating oxygen-containing gas by using a gas burner and the like and circulating the oxygen-containing gas in the thermal decomposition furnace can be used. An example of the oxygen-containing gas is mixed gas of combustible gas, such as LP gas or town gas, and air.

In the heating step, the oxygen concentration in the combustion section is controlled to a range from 6 vol % to less than 15 vol %, and therefore the resin components can be gently and stably combusted, and can be removed. A lower limit of the oxygen concentration is preferably 7 vol %, and more preferably, 8 vol %. An upper limit is preferably 14.8 vol %, and more preferably, 14.5 vol %. Note that if the oxygen concentration momentarily deviates from the range, but can be immediately controlled to fall under the range, it does not particularly matter in operation.

A method of controlling the oxygen concentration in the combustion section is not particularly limited. However, in the case of a gas furnace using mixed gas of LP gas and air, as the oxygen-containing gas, a mixing ratio of air can be adjusted depending on the oxygen concentration in the combustion section.

In the method according to the present invention, it is preferable that after the heating step, valuable materials that remain on the ceramic support (A) be recovered. It is preferable that the valuable materials be at least one selected from the group consisting of, for example, glass, a cell, silver, and an aluminum frame. Note that the silver is derived from, for example, an electrode.

In the method according to the present invention, in order to efficiently recover the valuable matters, it is effective that, for example, a wire mesh that does not hinder a movement of resin melted during combustion to the ceramic support (A) is installed between the photovoltaic module and the ceramic support (A) before heat processing, and the valuable materials after processing are recovered together with the wire mesh. This is because the object to be treated after resin serving as a sealing belt has been melted and combusted falls to pieces such as glass or a cell on the ceramic support, and it is difficult to recover, for example, glass or the cell.

<Photovoltaic Module>

For the photovoltaic module applicable to the present invention, any photovoltaic module can be utilized as long as it is not of the double-sided glass type and has a resin back sheet. Specific examples thereof include single crystal silicon photovoltaic batteries, polycrystalline silicon photovoltaic batteries, amorphous silicon photovoltaic batteries, heterojunction photovoltaic batteries, CIS photovoltaic batteries, CIGS photovoltaic batteries, and CdTe photovoltaic batteries. For the aluminum frame of the photovoltaic module, from the viewpoint of an advantage in which it is not necessary to cut the ceramic support (A) in accordance with the size of the aluminum frame, and tasks become easier, the aluminum frame may be removed before thermal decomposition, or it may be removed after thermal decomposition in order to reduce a probability that glass will be broken during removal.

<Ceramic Support (A)>

For the porous ceramic support (A) applicable to the present invention, anything can be used without limitations as long as it is stable at a combustion temperature (specifically, about 425° C. to 575° C.), which will be described later, and has a porous structure. Specific examples of the material thereof include stable and common ceramic materials such as alumina, zirconia, silicon nitride, silicon carbide, cordierite, ferrite, barium titanate, lead zirconate titanate, forsterite, zircon, mullite, steatite, and aluminum nitride.

The pore size of the porous material is not particularly limited, but it is suitably about 0.1 to 5 mm, into which, for example, EVA and PET easily permeate when they are melted at around 450° C. The number of cells on the surface is not particularly limited, either, but 5 to 50 pixels per inch (hereinafter abbreviated as "ppi") are desirable. There is no limitation on the porosity, either, but it is preferably about 50 to 95%. In particular, one having a three-dimensional skeleton structure with continuous pores can be suitably used.

Similarly, the shape of the ceramic support (A) is not particularly limited, but in order to arrange the resin used in the photovoltaic module in such a way that the resin does not fall, a plate-shaped one can be suitably used. Furthermore, from the viewpoint that the generation of "soot" due to leakage of melted resin components to an outside of the ceramic support (A) can be suppressed, the size (area) of a surface of the ceramic support (A) on which the back sheet is loaded is preferably as large as possible within the range that the surface can fit within the aluminum frame in a case where the aluminum frame is not removed (see FIG. 1), and in a case where the aluminum frame is removed from the photovoltaic module, it is preferably larger than the bottom area of the back sheet (see FIG. 2).

There is no limitation on the thickness of the ceramic support (A), but one having a thickness of about 10 to 60 mm is suitable.

As the ceramic support (A) as described above, a product called a ceramic foam, a ceramic filter, or a ceramic foam filter, which is made of alumina, silicon carbide, and cordierite is suitable.

In performing processing on the waste photovoltaic module by using the method according to the present invention, the photovoltaic module is placed on the ceramic support (A) with the back sheet surface facing down. By allowing the back sheet surface to face down, the resin components constituting the back sheet and the sealing resin layer are melted due to heating, and then flow out toward the ceramic support (A) due to the action of gravity.

The ceramic support (A) is porous, so that the resin that has flowed down has a large contact area with the atmosphere in the thermal decomposition furnace. Therefore, the efficiency of combustion due to further heating increases, and the generation of "soot" can be suppressed.

<Porous Material (B)>

In the porous material (B) carrying a transition metal oxide that is used in the present invention, the transition metal oxide has an ability to adsorb oxygen when in the oxidized state and to decompose an organic compound containing an aromatic ring that has been produced by oxidatively decomposing an aromatic resin during combustion. For example, chromium(III) oxide is in the reduced state at room temperature and has a bright green color, but when heated to 400° C. or higher in the presence of oxygen, it adsorbs oxygen and changes its color to black-green, which is in the oxidized state.

The present inventors have discovered that when a ceramic support that is similar to the ceramic support (A) (for example, a ceramic filter) is coated with chromium(III) oxide, and is arranged in a furnace, "soot", which adheres to the ceramic filter, is rarely generated. It can be considered that the organic compound containing the aromatic ring has been decomposed by the transition metal oxide, and therefore generation of "soot" has been suppressed. It was found that this phenomenon also occurs in, for example, iron(III) oxide, copper(II) oxide, and titanium(IV) oxide.

From the above, when at least a part of the resin constituting the back sheet is an aromatic resin such as PET (a resin having an aromatic group as a part of the repeating unit), from the viewpoint that the occurrence of "soot" can be suppressed, it is suitable to allow the transition metal oxide to be present in the furnace.

As the transition metal oxide, oxides of, for example, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, and mercury can be used without any limitations.

Among the above, preferable examples include oxides of first transition elements including scandium, titanium, vanadium, chromium, manganese, iron, cobalt, nickel, and copper; oxides of second transition elements including yttrium, zirconium, niobium, molybdenum, technetium, ruthenium, rhodium, palladium, and silver; and oxides of third transition elements including lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, and gold, and more preferably, transition metal oxides such as rutile or anatase type titanium(IV) oxide, chromium(III) oxide, iron(III) oxide, and copper(II) oxide can be suitably utilized. These may be in the state of composite oxides.

In order to increase the contact area, it is suitable for the transition metal oxide to be carried by the porous material (B) and be present in the furnace. The porous material (B) may be any material as long as it is stable at the combustion temperature of the resin components, similarly to the ceramic support (A), and the similar material may be used. The shape of the porous material (B) is not particularly limited, and is not particularly limited as long as it can be used as a what is called catalyst carrier. However, it is more preferably a plate-shaped porous molded body that is similar to the ceramic support (A) on which the photovoltaic module is placed.

As a method of having a porous material carry the transition metal oxide, a known technique can be used without any limitations. Specifically, a method of impregnating a porous material in a solution including the transition metal oxide by using, for example, dip coating, wash coating, spray coating, or spin coating, and having it carry the transition metal oxide is common. After that, the solution is removed by heating the porous material to the boiling point of the solution or higher. This is the simplest method. Alternatively, a thermal spraying technique in which a melted transition metal oxide is sprayed onto a porous material may be utilized.

In the present invention, the ceramic support (A) on which the photovoltaic module is placed is placed on the porous material (B) carrying the transition metal oxide.

Note that an aspect in which the porous material (B) carrying the transition metal oxide is not in direct contact with the photovoltaic module is preferable, and in particular, an aspect in which the porous material is arranged below the photovoltaic module so that the porous material does not come into direct contact with the photovoltaic module is more preferable. This is because the porous material (B) is less likely to be contaminated by non-combustible components such as fillers included in, for example, the back sheet of the photovoltaic module, and when the porous material (B) carrying the transition metal oxide is repeatedly used, it is not necessary to perform a regeneration treatment and the like.

As the size of the porous material (B), from the viewpoint of stability of an object to be treated including a photovoltaic module, it is preferable that a loading surface of the porous material (B) have an area that is similar to the bottom area of the ceramic support (A). The thickness of the porous material (B) is suitably about 10 to 60 mm.

EXAMPLES

The present invention is described in more detail below with reference to Examples, but the present invention is not limited to the Examples described below.

Example 1

A thermal decomposition furnace 20, as illustrated in FIG. 3, was used, and heat treatment was performed by causing a chain conveyor 24 to move an object to be treated 23 including a photovoltaic module 7 from a left-hand side (a side of an inlet) of a thermal decomposition furnace section 22 toward a right-hand side (a side of an outlet) in the furnace.

As the photovoltaic module 7, "REC solar panel" manufactured by REC (cell type: REC PE polycrystalline photovoltaic cell; size: 1,665 mm×991 mm×38 mm) was used, and an experiment was conducted. An aluminum frame 10, a junction box, and a connector were removed by using a scraper and a hammer before heat treatment such that glass was not damaged.

For a ceramic filter serving as a ceramic support (A)2, FCF-2 (made of silicon carbide) 10 ppi 400 mm×300 mm×30 mmt (vacancy ratio: 87.8%) manufactured by SEISEN FILTER was used.

Wako 1st Grade chromium(III) oxide (manufactured by FUJIFILM Wako Pure Chemical Corporation) was stirred while suspended in water, the ceramic filter was immersed to perform dip coating, and was dried at 450° C., and a porous material (B)1 was obtained. The mass before coating was 1,480 g, and the mass after coating and drying was 1,790 g.

An iron lattice tray of 2,100 mm×1,210 mm×50 mm was made, and the porous material (B)1 of 2,100 mm×1,200 mm×30 mmt was placed at a lowest stage by using 21 ceramic filters coated with chromium oxide. At a middle stage above it, the ceramic support (A)2 of 2,100 mm×1,200 mm×30 mmt was installed by using 21 ceramic filters of 400 mm×300 mm×30 mmt. Moreover, above it, the photovoltaic module 7 was installed with a back sheet 3 facing down.

A gas furnace was used as the thermal decomposition furnace 20. As the gas furnace, a hot air circulation type heat treatment device of a cyclically fed chain-blow type that has a furnace length of 5,400 mm, a furnace width of 2,300 mm, and a furnace height of 280 mm was used. As a gas burner section 21, metallic burner MJPE-200K was used, and mixed gas of LP gas and air was combusted and heated. The mixed gas was supplied while being limited by a slit from a lower side of the thermal decomposition furnace section 22, by using "6.0-LF limit load fan" (450 m³/minute, 2.0 kPa, 30 kW) manufactured by ADACHI KIKO CO., LTD., and was forcefully sprayed on the porous material (B)1 in such a way that heat can be exchanged, and a part of the heated gas that was circulated was exhausted.

The object to be treated 23 that was prepared as described above, and includes the photovoltaic module 7, the ceramic support (A)2, and the porous material (B)1 was cyclically fed from the side of the inlet of the thermal decomposition furnace section 22 toward the side of the outlet in three sections in the furnace while the object to be treated 23 was held for 6.5 minutes in each of the three sections, and heat treatment was performed for 19.5 minutes in total by using the thermal decomposition furnace 20. The side of the inlet serves as a temperature rising section 27, and a zone where resin components included in the photovoltaic module 7 are combusted serves as a combustion section 28. Note that a thermocouple type thermometer was inserted into a center of an upper part of the ceramic support (A)2 at the middle stage, and the temperature of the object to be treated 23 was measured.

In heat treatment, an oxygen concentration measurement section 26 adjusted a ratio of air in the mixed gas to be supplied in such a way that the oxygen concentration of the combustion section 28 ranges from 6 vol % to less than 15 vol %, and adjusted a heating temperature and a supply amount of the mixed gas to be supplied in such a way that the temperature of the object to be treated 23 in the combustion section 28 is 470° C. or higher.

As a result of performing heat treatment, as described above, as illustrated in FIG. 4, the temperature in the furnace could be stably controlled within a range of 470 to 530° C., by controlling the oxygen concentration in the combustion section 28 in heat treatment to a range from 6 vol % to less than 15 vol %. Stated another way, it was found that in a low oxygen atmosphere, gentle combustion without a flame enables stable temperature control and treatment performed on the object to be treated 23. After heat treatment, tempered glass 6 could be recovered without breaking, and a cell 5 and inorganic powder could also be recovered. Moreover, attachment of "soot" was not observed in the ceramic filter at the lowest stage, which was used as the porous material (B)1.

Comparative Example 1

Heat treatment was performed on the object to be treated 23 including the photovoltaic module 7 similarly to Example 1 excluding the oxygen concentration measurement section 26 changing conditions in such a way that the combustion section 28 has an oxygen concentration of 15 vol % or more. As a result, as illustrated in FIG. 4, a temperature in the furnace rapidly increased due to explosive combustion with a flame, and this required countermeasures such as a reduction in a supply amount of gas to be supplied. Stated another way, it was found that in a normal oxygen atmosphere, it is difficult to stably control temperature in the furnace, and this results in an increase in a processing cost.

REFERENCE SIGNS LIST

1 Porous material (B) carrying transition metal oxide
2 Porous ceramic support (A)
3 Back sheet
4 Sealing resin layer (EVA)
5 Cell
6 Tempered glass
7 Photovoltaic module (X)
8 Shelf board or wire mesh
9 Gas furnace or electric furnace
10 Aluminum frame
20 Thermal decomposition furnace
21 Gas burner section
22 Thermal decomposition furnace section
23 Object to be treated
24 Chain conveyor
25 Temperature measurement section
26 Oxygen concentration measurement section
27 Temperature rising section
28 Combustion section

The invention claimed is:

1. A waste photovoltaic module processing method of continuously treating a waste photovoltaic module, the waste photovoltaic module processing method comprising: a heating step of heating a photovoltaic module having a resin back sheet and a sealing resin layer in a thermal decomposition furnace to melt and oxidatively decompose resin components included in the photovoltaic module,
wherein the heating step is performed by moving the photovoltaic module in the thermal decomposition furnace from an inlet of the thermal decomposition furnace toward an outlet in a state where the photovoltaic module is placed on a porous ceramic support (A), and the ceramic support (A) is placed on a porous material (B) carrying a transition metal oxide, and an inside of the thermal decomposition furnace includes a temperature rising section in a stage where a temperature of the photovoltaic module rises, and a combustion section in a stage where the resin components are oxidatively decomposed, and an oxygen concentration in the combustion section is controlled to a range from 6 vol % to less than 15 vol %.

2. The waste photovoltaic module processing method according to claim 1, wherein a plurality of the photovoltaic modules are in a heated state in the thermal decomposition furnace.

3. The waste photovoltaic module processing method according to claim 1, wherein after the heating step, valuable materials that remain on the ceramic support (A) are recovered.

4. The waste photovoltaic module processing method according to claim 2, wherein after the heating step, valuable materials that remain on the ceramic support (A) are recovered.

\* \* \* \* \*